(12) United States Patent
Lee

(10) Patent No.: US 6,532,863 B1
(45) Date of Patent: Mar. 18, 2003

(54) FOOD PROCESSOR

(76) Inventor: Ming-Tsung Lee, P.O. Box 90, Tainan City (TW)

(*) Notice: Subject to any disclaimer, the term of this patent is extended or adjusted under 35 U.S.C. 154(b) by 0 days.

(21) Appl. No.: 10/232,664

(22) Filed: Sep. 3, 2002

(51) Int. Cl.$^7$ .......................... A47J 43/046; B01F 7/00; B01F 7/16; B02C 18/12; B02C 18/20

(52) U.S. Cl. .................. 99/348; 241/282.1; 241/282.2; 241/292.1; 366/205; 366/314

(58) Field of Search .......................... 99/348, 510, 513, 99/485, 467; 366/205, 206, 96–98, 197, 199, 314, 315, 342, 343, 307, 309; 241/282.1, 282.2, 282.5, 292.1, 97, 98, 277, 199.12, 46.17; 403/300, 206; D7/378

(56) References Cited

U.S. PATENT DOCUMENTS

| | | | | |
|---|---|---|---|---|
| 4,143,824 A | * | 3/1979 | Shiotani | 366/314 X |
| 4,200,244 A | * | 4/1980 | Sontheimer | 241/282.1 |
| 4,462,694 A | * | 7/1984 | Ernster et al. | 366/205 |
| 4,733,827 A | * | 3/1988 | Williams | 241/282.2 X |
| 5,645,346 A | * | 7/1997 | Thuna | 366/205 |
| 5,799,567 A | * | 9/1998 | Dorner | 99/348 |
| 5,823,672 A | * | 10/1998 | Barker | 366/314 X |
| 6,092,922 A | * | 7/2000 | Kett et al. | 366/205 |
| 6,189,441 B1 | * | 2/2001 | Beaudet et al. | 99/348 X |
| 6,223,652 B1 | * | 5/2001 | Calia et al. | 99/513 |
| 6,364,226 B1 | * | 4/2002 | Kubicko | 241/282.1 |
| 6,375,102 B1 | * | 4/2002 | Bouleau et al. | 241/282.1 X |
| 6,446,547 B2 | * | 9/2002 | Kubicko et al. | 99/467 |

* cited by examiner

Primary Examiner—Timothy F. Simone

(57) ABSTRACT

A food processor in the present invention includes a spindle, a blade holder, a positioning member, an elastic retaining member, a flexible member and a push member. Only to press down the push member, engagement hooks and guide blocks of the push member will slide downwards along slide grooves of the positioning member to compress the flexible member and lower an inclined plane of the push member to press against an inner wall surface of a clamp part of the elastic retaining member to force the clamp part to be stretched outwardly so as to release a projection of the spindle, thereby the blade holder can be easily disassembled and assembled for the convenience of completely cleaning residuary foodstuff out of the blade holder to keep the blade holder in a good sanitary condition ready for the next use so as to prolong the working life of the food processor.

1 Claim, 5 Drawing Sheets

FOOD PROCESSOR

BACKGROUND OF THE INVENTION

1. Field of the Invention

This invention relates to a food processor, particularly to one provided with a blade holder, a positioning member, an elastic retaining member, a flexible member and a push member capable of being disconnected with a spindle mounted on a machine body of the food processor, thereby the blade holder can be easily disassembled and assembled for the convenience of completely cleaning residuary foodstuff out of the blade holder to keep the blade holder in a good sanitary condition ready for the next use so as to prolong the working life of the food processor.

2. Description of the Prior Art

Generally speaking, known conventional food processors are provided with fixed blade holders that are unable to be disassembled from the food processors for completely cleaning residuary foodstuff out of the blade holders after use. The residuary foodstuff remains on the blade holders so long that it is likely to cause sanitary problems in the next use of the blade holders. After a long-term use, the blade holders will be seriously polluted and destroyed by the residuary foodstuff, thus greatly decreasing the working life of the conventional food processors.

SUMMARY OF THE INVENTION

The main purpose of the invention is to offer a food processor permitting a blade holder to be easily disassembled and assembled for the convenience of completely cleaning residuary foodstuff out of the blade holder to keep the blade holder in a good sanitary condition ready for the next use so as to prolong the working life of the food processor.

The main feature of the invention is to provide a food processor mainly including:

a spindle having a threaded connection part disposed at a lower portion thereof, a rotary joint disposed at an upper portion thereof, and a projection disposed at a top of the rotary joint;

a blade holder capable of being combined with the rotary joint of the spindle, and having a pair of blades respectively mounted at both sides thereof, a chamber formed therein, a supporting edge disposed at a top surface thereof, and an engagement edge disposed in the chamber;

a positioning member being accommodated in the chamber of the blade holder, and having an engagement part disposed at a lower portion thereof, at least one longer slide slot and at least one shorter slide slot respectively disposed in a peripheral wall thereof, a through hole formed therein, and a plurality of slide grooves disposed in an inner wall surface thereof for corresponding in location to the at least one longer slide slot and the at least one shorter slide slot;

an elastic retaining member being accommodated in the through hole of the positioning member, and having a clamp part disposed at a lower portion thereof, a through hole formed therein, and at least one stop block protruded outwardly from a top thereof for being inserted in and stopped against by the at least one shorter slide slots, the clamp part provided with several split-up slots disposed in a peripheral wall thereof;

a flexible member being accommodated in the through hole of the positioning member and placed on the elastic retaining member; and, a push member being accommodated in the through hole of the positioning member and fitted in the flexible member, the push member having an inclined plane disposed at a bottom thereof, at least one engagement hook and at least one guide block respectively disposed in a peripheral wall thereof, each of the engagement hooks capable of being inserted in and hooking with each of the longer slide slots and sliding in each of the slide grooves corresponding in location to the longer slide slots, each of the guide blocks capable of sliding in each of the slide grooves corresponding in location to the shorter slide slots.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
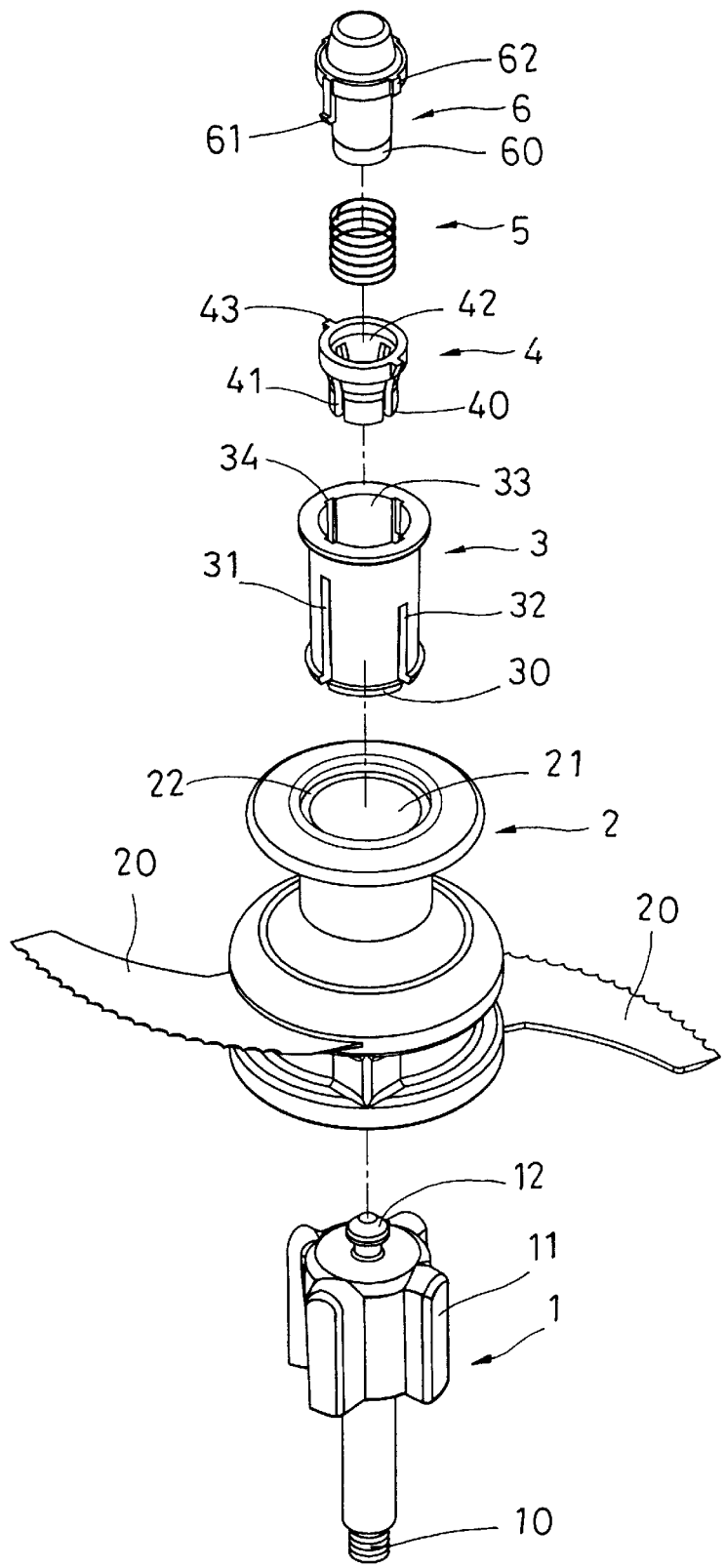
FIG. 1 is an exploded perspective view of a food processor in the present invention.

A preferred embodiment of a clip driver in the present invention, as shown in FIG. 1, mainly includes a spindle 1, a blade holder 2, a positioning member 3, an elastic retaining member 4, a flexible member 5 and a push member 6.

The spindle 1 has a threaded connection part 10 disposed at a lower portion thereof, a rotary joint 11 disposed at an upper portion thereof, and a projection 12 disposed at a top of the rotary joint 11.

Figure 3:
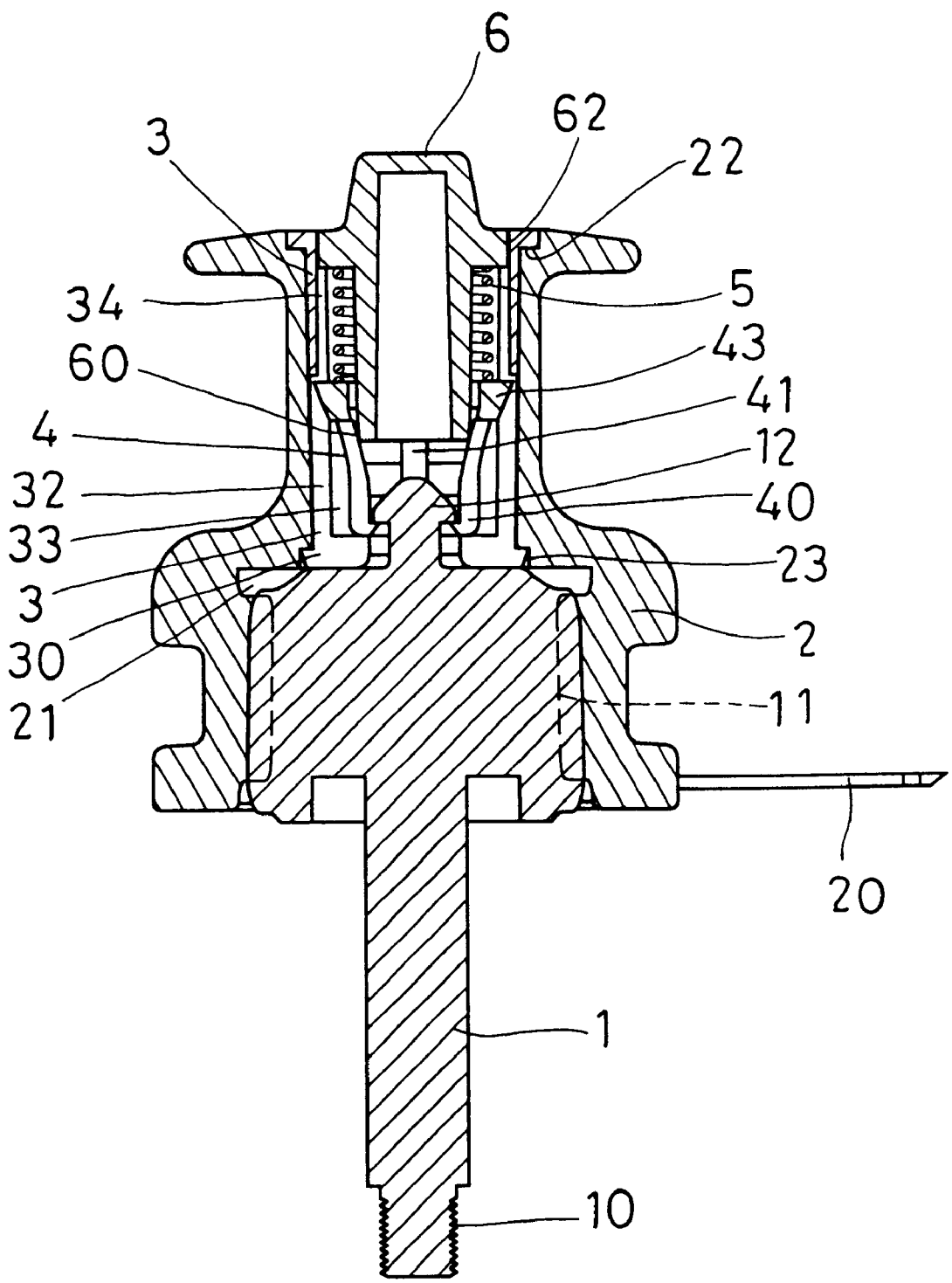
FIG. 3 is a sectional view of the food processor in the present invention.

The blade holder 2 capable of being combined with the rotary joint 11 of the spindle 1 has a pair of blades 20 respectively mounted at both sides thereof, a chamber 21 formed therein, a supporting edge 22 disposed at a top surface thereof, and an engagement edge 23 disposed in the chamber 21, as shown in FIG. 3.

The positioning member 3 being accommodated in the chamber 21 of the blade holder 2 has an engagement part 30 disposed at a lower portion thereof, two longer slide slots 31 respectively disposed in a peripheral wall thereof and corresponding in location to each other, two shorter slide slots 32 respectively disposed in the peripheral wall thereof and corresponding in location to each other, a through hole 33 formed therein, and four slide grooves 34 disposed in an inner wall surface thereof and respectively corresponding in location to the two longer slide slots 31 and the two shorter slide slots 32.

The elastic retaining member 4 being accommodated in the through hole 33 of the positioning member 3 has a clamp part 40 disposed at a lower portion thereof, a through hole 42 formed therein, and two stop blocks 43 respectively protruded outwardly from a top thereof for being inserted in and stopped against by the two shorter slide slots 32. The clamp part 40 is provided with several split-up slots 41 respectively disposed in a peripheral wall thereof.

The flexible member 5 are accommodated in the through hole 33 of the positioning member 3 and placed on the elastic retaining member 4.

The push member 6 are accommodated in the through hole 33 of the positioning member 3 and fitted in the flexible member 5. The push member 6 has an inclined plane 60 disposed at a bottom thereof, two engagement hooks 61 respectively disposed in a peripheral wall thereof and corresponding in location to each other, and two guide blocks 62 respectively disposed in the peripheral wall thereof and corresponding in location to each other. The two engagement hooks 61 are capable of being respectively inserted in and hooking with the two longer slide slots 31 and can slide in the two slide grooves 34 corresponding in location to the two longer slide slots 31. The two guide blocks 62 are capable of respectively sliding in the two slide grooves 34 corresponding in location to the shorter slide slots 32.

Figure 2:
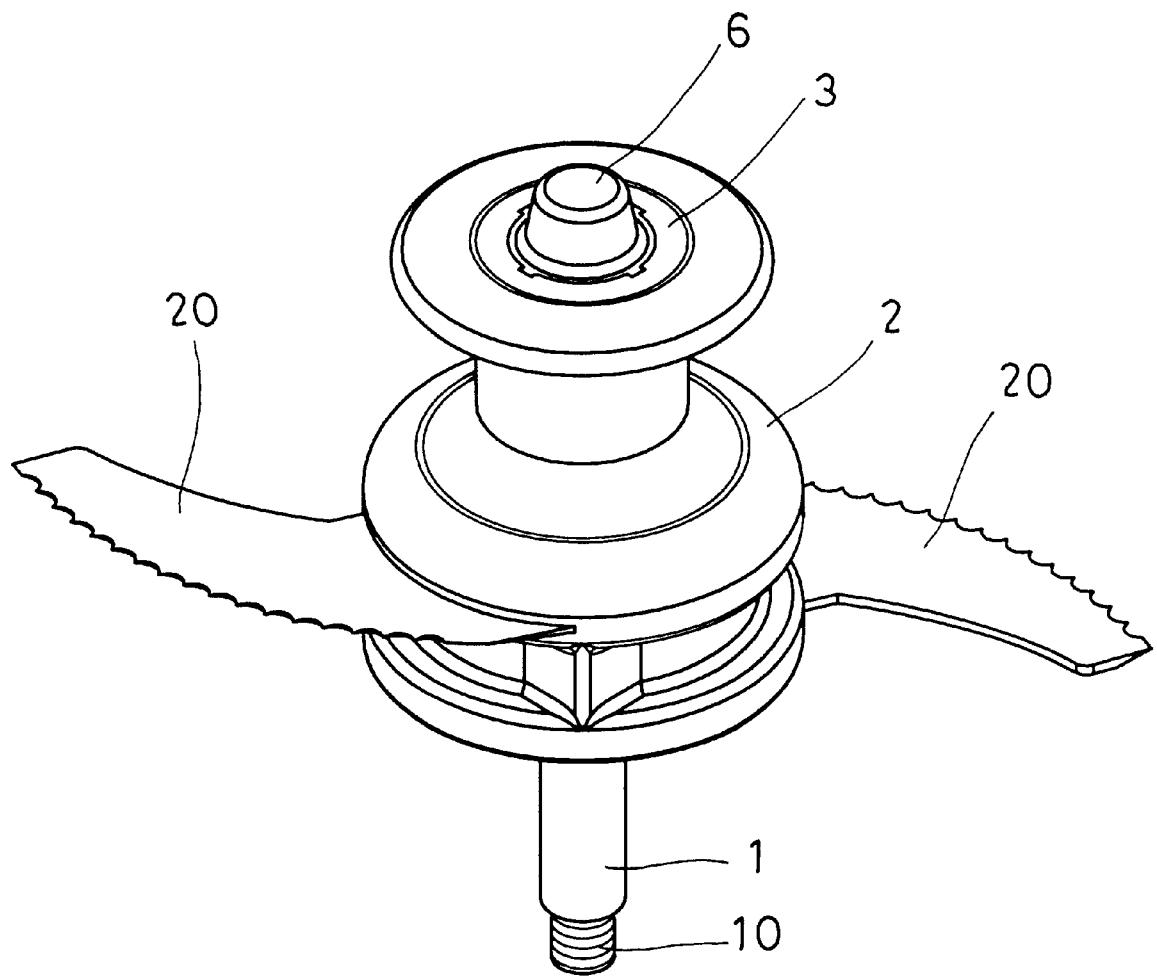
FIG. 2 is a perspective view of the food processor in the present invention.

In assembling, referring to FIGS. 1 to 3, firstly combine a lower portion of the chamber 21 of the blade holder 2 with the rotary joint 11 of the spindle 1. Secondly, place the positioning member 3 in an upper portion of the chamber 21 with the engagement part 30 of the positioning member 3 engaged with the engagement edge 23 of the blade holder 2 and with a top of the positioning member 3 rested against the supporting edge 22 of the blade holder 2. Thirdly, place the elastic retaining member 4 in the through hole 33 of the positioning member 3 with the two stop blocks 43 of the elastic retaining member 4 respectively inserted in and stopped against by the two shorter slide slots 32 of the positioning member 3 and with the clamp part 40 of the elastic retaining member 4 securely clamping the projection 12 of the spindle 1. Fourthly, place the flexible member 5 in the through hole 33 of the positioning member 3 and on the elastic retaining member 4. Fifthly, place the push member 6 in the through hole 33 of the positioning member 3 and make the push member 6 fitted into the flexible member 5 with the two engagement hooks 61 of the push member 6 respectively inserted in and hooking with the longer slide slots 31 of the positioning member 3, as shown in FIG. 4, and with the two guide blocks 62 of the push member 6 respectively positioned in the slide grooves 34 corresponding in location to the shorter slide slots 32 of the positioning member 3, by which a whole assemblage of the food processor of the present invention is completed.

Figure 4:
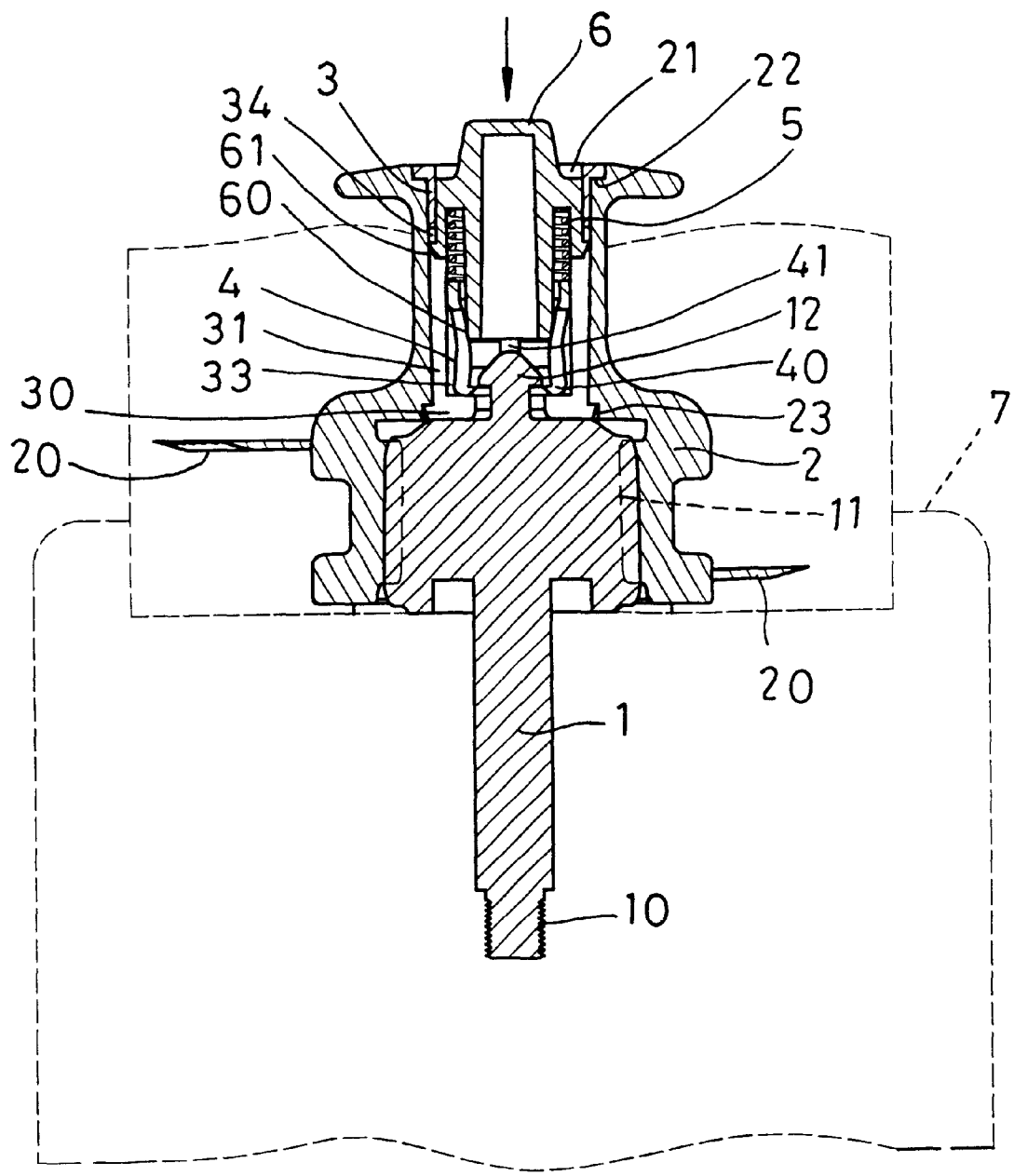
FIG. 4 is a schematic sectional view of the food processor in the present invention, showing a push member being pressed down to force a clamp part of an elastic retaining member to be stretched outwardly; and, FIG. 5 is a schematic sectional view of the food processor in the present invention, showing a blade holder capable of being disconnected with a spindle mounted on a machine body of the food processor.
Figure 5:
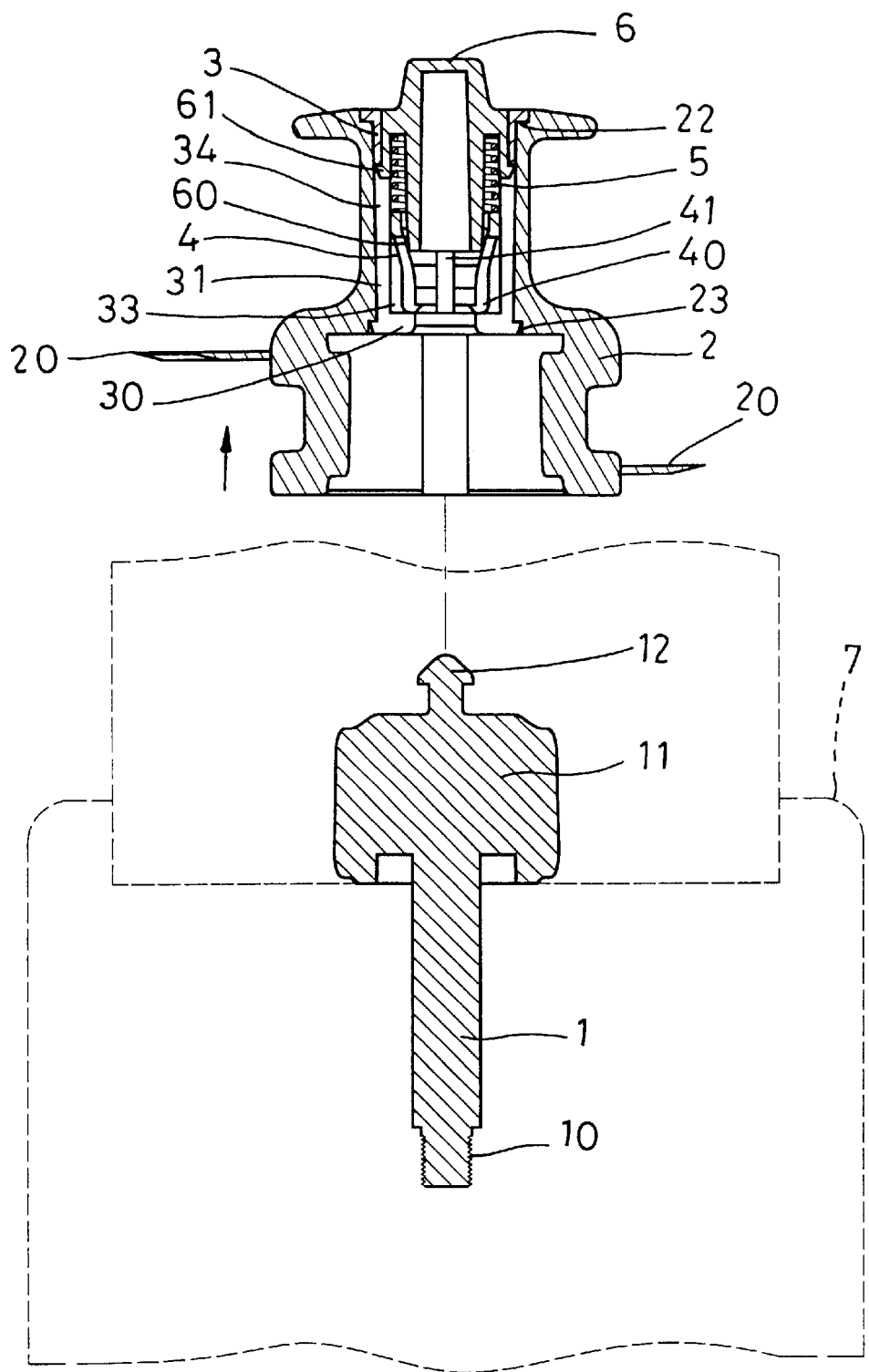

In using, referring to FIGS. 4 and 5, only to press down the push member 6, the two engagement hooks 61 and the two guide blocks 62 (see also FIG. 3) of the push member 6 will slide downwards along the slide grooves 34 of the positioning member 3 to compress the flexible member 5 and lower the inclined plane 60 of the push member 6 to press against an inner wall surface of the clamp part 40 of the elastic retaining member 4 to force the claim part to be stretched outwardly so as to release the projection 12 of the spindle 1, thereby the blade holder 2, the positioning member 3, the elastic retaining member 4, the flexible member 5 and the push member 6 can be disconnected with the spindle 1 mounted on a machine body 7 of the food processor for the convenience of completely cleaning residuary foodstuff out of the blade holder 2 to keep the blade holder 2 in a good sanitary condition ready for the next use.

While the preferred embodiment of the invention has been described above, it will be recognized and understood that various modifications may be made therein and the appended claims are intended to cover all such modifications that may fall within the spirit and scope of the invention.

What is claimed is:

1. A food processor comprising:

a spindle having a threaded connection part disposed at a lower portion thereof, a rotary joint disposed at an upper portion thereof, and a projection disposed at a top of said rotary joint;

a blade holder capable of being combined with said rotary joint of said spindle, and having a pair of blades respectively mounted at both sides thereof, a chamber formed therein, a supporting edge disposed at a top surface thereof, and an engagement edge disposed in said chamber;

a positioning member being accommodated in said chamber of said blade holder, and having an engagement part disposed at a lower portion thereof, at least one longer slide slot and at least one shorter slide slot respectively disposed in a peripheral wall thereof, a through hole formed therein, and a plurality of slide grooves disposed in an inner wall surface thereof for corresponding in location to said at least one longer slide slot and said at least one shorter slide slot;

an elastic retaining member being accommodated in said through hole of said positioning member, and having a clamp part disposed at a lower portion thereof, a through hole formed therein, and at least one stop block each protruded outwardly from a top thereof for being inserted in and stopped against by said at least one shorter slide slot, said clamp part provided with several split-up slots disposed in a peripheral wall thereof;

a flexible member being accommodated in said through hole of said positioning member and placed on said elastic retaining member;

a push member being accommodated in said through hole of said positioning member and fitted in said flexible member, said push member having an inclined plane disposed at a bottom thereof, at least one engagement hook and at least one guide block respectively disposed in a peripheral wall thereof, each said engagement hook capable of being inserted in and hooking with each said longer slide slot and sliding in each said slide groove corresponding in location to each said longer slide slot, each said guide block capable of sliding in each said slide groove corresponding in location to each said shorter slide slot; and, whereby only to press down said push member, said at least one engagement hook and said at least one guide block will slide downwards along said slide grooves of said positioning member to compress said flexible member and lower said inclined plane to press against an inner wall surface of said clamp part of said elastic retaining member to force said clamp part to be stretched outwardly so as to release said projection of said spindle, thereby said blade holder, said positioning member, said elastic retaining member, said flexible member and said push member can be disconnected with said spindle mounted on a machine body of said food processor for the convenience of completely cleaning residuary foodstuff out of said blade holder to keep said blade holder in a good sanitary condition ready for the next use.

* * * * *